(12) United States Patent
Ulekleiv et al.

(10) Patent No.: US 9,689,531 B2
(45) Date of Patent: Jun. 27, 2017

(54) BOSS FOR COMPOSITE CONTAINER

(75) Inventors: Rune Ulekleiv, Gjøvik (NO); Per Vidar Hamnvik, Raufoss (NO)

(73) Assignee: HEXAGON RAGASCO AS, Raufoss (NO)

( * ) Notice: Subject to any disclaimer, the term of this patent is extended or adjusted under 35 U.S.C. 154(b) by 417 days.

(21) Appl. No.: 14/128,197

(22) PCT Filed: Jun. 27, 2012

(86) PCT No.: PCT/EP2012/062471
§ 371 (c)(1),
(2), (4) Date: Apr. 1, 2014

(87) PCT Pub. No.: WO2013/000956
PCT Pub. Date: Jan. 3, 2013

(65) Prior Publication Data
US 2014/0239001 A1  Aug. 28, 2014

(30) Foreign Application Priority Data

Jun. 28, 2011  (NO) .................................. 20110930

(51) Int. Cl.
*F17C 13/04* (2006.01)
*F17C 1/06* (2006.01)
*F17C 1/16* (2006.01)

(52) U.S. Cl.
CPC ................. *F17C 1/06* (2013.01); *F17C 1/16* (2013.01); *F17C 2201/0109* (2013.01);
(Continued)

(58) Field of Classification Search
USPC ....... 220/581, 582, 583, 584, 585, 586, 587, 220/588, 589, 590, 591, 592; 215/314,
(Continued)

(56) References Cited

U.S. PATENT DOCUMENTS 3,137,405 A * 6/1964 Gorcey .................... F17C 1/10
220/590
4,085,860 A * 4/1978 Hawkins ................ F16K 17/40
220/89.4

(Continued)

FOREIGN PATENT DOCUMENTS

CN    1343288    4/2002
EP    0 958 473  6/2003
(Continued)

OTHER PUBLICATIONS

Notification of the First Office Action issued Oct. 8, 2014 in corresponding Chinese patent application No. 2012800327883.
(Continued)

*Primary Examiner* — J. Gregory Pickett
*Assistant Examiner* — Allan Stevens
(74) *Attorney, Agent, or Firm* — Wenderoth, Lind & Ponack, L.L.P.

(57) ABSTRACT

A composite pressure container for fluids includes a pressure container, a boss (1), and a coupling or valve member (5) fitted in an opening in the boss. The pressure container includes an inner fluid-tight liner layer (4) and a pressure supporting layer (3) formed by winding fiber-reinforcement onto the liner layer. The boss is positioned in a central opening of the pressure container. The structure of the boss comprises a depressurization passage for preventing build-up of internal pressure inside the boss.

6 Claims, 2 Drawing Sheets

(52) U.S. Cl.
CPC ...... *F17C 2201/056* (2013.01); *F17C 2203/0604* (2013.01); *F17C 2203/066* (2013.01); *F17C 2203/0619* (2013.01); *F17C 2203/0663* (2013.01); *F17C 2205/0305* (2013.01); *F17C 2205/0323* (2013.01); *F17C 2205/0394* (2013.01); *F17C 2209/2118* (2013.01); *F17C 2209/2127* (2013.01); *F17C 2209/227* (2013.01); *F17C 2221/012* (2013.01); *F17C 2221/033* (2013.01); *F17C 2221/035* (2013.01); *F17C 2223/0123* (2013.01); *F17C 2223/0153* (2013.01); *F17C 2223/035* (2013.01); *F17C 2223/036* (2013.01); *F17C 2260/021* (2013.01); *F17C 2260/037* (2013.01); *F17C 2260/042* (2013.01); *F17C 2270/01* (2013.01); *Y02E 60/321* (2013.01)

(58) Field of Classification Search
USPC .......................................................... 215/313
See application file for complete search history.

(56) References Cited

U.S. PATENT DOCUMENTS

| | | | |
|---|---|---|---|
| 5,253,778 | A | 10/1993 | Sirosh |
| 5,429,845 | A | 7/1995 | Newhouse et al. |
| 5,979,692 | A * | 11/1999 | West .............. F17C 1/16 220/586 |
| 2004/0182869 | A1* | 9/2004 | Kubo .............. F17C 1/00 220/581 |
| 2008/0128034 | A1* | 6/2008 | Fahl .............. F16L 37/18 137/614.06 |
| 2008/0251520 | A1 | 10/2008 | Ota et al. |
| 2009/0078706 | A1* | 3/2009 | Ishitoya .......... B60K 15/07 220/562 |
| 2011/0168726 | A1* | 7/2011 | Vieira .............. F17C 1/16 220/590 |
| 2011/0240655 | A1* | 10/2011 | Lindner .......... F16J 12/00 220/589 |
| 2011/0284562 | A1* | 11/2011 | Novak .............. F17C 1/16 220/694 |
| 2012/0048865 | A1 | 3/2012 | Eihusen et al. |

FOREIGN PATENT DOCUMENTS

| | | |
|---|---|---|
| EP | 1 204 833 | 9/2010 |
| JP | 2005-291434 | 10/2005 |
| NO | 306226 | 10/1999 |
| NO | 309667 | 3/2001 |
| NO | 312048 | 3/2002 |
| WO | 2010/091062 | 8/2010 |
| WO | 2011/098703 | 8/2011 |

OTHER PUBLICATIONS

International Search Report issued Sep. 13, 2012 in International Application No. PCT/EP2012/062471.
Norwegian Search Report issued Nov. 10, 2011 in corresponding Norwegian patent application No. 20110930.
Written Opinion of the International Searching Authority issued Sep. 13, 2012 in International Application No. PCT/EP2012/062471.
Official Action issued Oct. 25, 2016 in corresponding European patent application No. 12 729 651.5.

* cited by examiner

BOSS FOR COMPOSITE CONTAINER

BACKGROUND OF THE INVENTION

1. Technical Field

The present invention relates to an improved boss for a composite pressure container. Especially, the present invention relates to a boss adapted to avoid internal pressure built up.

This invention concerns an improved boss for a composite pressure container for fluids, wherein the container comprises an inner fluid-tight thermoplastic liner layer and a pressure supporting layer formed by winding fiber-reinforcement onto the liner layer, as well as at least one central aperture in at least one end, for provision of a boss for mounting a coupling or a valve member.

2. Description of the Related Art

A boss for composite pressure containers is disclosed in Norwegian Patent No. 312048. Composite pressure containers are disclosed in Norwegian Patent No. 306226 and 309667.

Pressure containers like these are subject to numerous and varied types of stress and forces. Mainly, this regards the inner over pressure which may occur when filling the container with fluids. The inner pressure will influence the boss with an axially outward directed force which may be considerable. Additionally, the boss construction may be influenced by an axially inward directed force, e.g., when a valve or coupling member is mounted to the boss, and possibly by unintended stress caused by impacts or blows. It is important that the construction and mounting/fixation of the boss is also capable of resisting such forces. The same is valid for torsion forces which may occur when for instance the valve member is mounted onto the boss, which is usually formed with threads and screwed into the boss. Torsion forces to be concerned in this regard could also occur when the fiber-reinforcement is winded onto the inner liner. It is especially important that the boss provides a safe and durable sealing against the adjacent parts of the pressure container. The sealing has to be such that the above-mentioned forces are not damaging to the sealing effect.

Norwegian Patent No. 312048, mentioned above, discloses a boss suitable for use in the present type of pressure containers.

Composite pressure containers can contain different fluids such as propane and butane, for domestic use often with a relatively low maximum pressure of about 35 bars. The containers can also hold fluids such as CNG, hydrogen and other industrial gas types often requiring a higher maximum pressure of about 200 bars. Composite pressure containers may be adapted to withstand pressures in large intervals. Depending on the external temperature, the pressure within the container may be from below atmospheric pressure and up to 2000 bars. Depending on the fluid to be contained therein the pressure containers will normally be constructed to withstand pressures within selected intervals, examples of such intervals could be but are not limited to 0-20 bars, 4-260 bars, 1-1500 bars etc.

SUMMARY OF THE INVENTION

It is an object of the present invention to provide a boss suitable for use in composite pressure containers holding fluids of not only relatively low pressures, but which can also be used on pressure containers holding fluids of higher pressures, and which boss is not expensive to produce.

The pressure, temperature or concentration differences over the boss materials may cause permeation of fluid through the materials. This is especially relevant in connection with sealings such as O-rings and sealing surfaces. If a boss comprises an environmental O-ring, or a gas tight sealing such as a gas tight threaded connection or another type of connection above (axially outside of), the inner main sealing pressure can build up within the boss in between the main sealing the additional gas tight sealing. Build up of internal pressure within the boss can influence the safety and proper functioning of the boss.

Another object of the present invention is therefore to assure that any fluid under pressure that may permeate through the sealing or the materials of the sealing surfaces of a boss is inhibited from building up pressure within the boss. Equivalently any leakage including thermal induced leakage is inhibited from resulting in pressure built up within the boss.

A further object of the present invention is to provide a boss with long durability also at high pressures, thereby allowing the container to be reused many times and reducing costs.

To obtain these and other objectives, the present invention provides a boss for a composite pressure container for fluids, wherein the pressure container comprises an inner fluid-tight liner layer and a pressure supporting layer formed by winding fiber-reinforcement onto the liner layer, as well as a central opening in one end provided with the boss for fitting to a coupling or valve member. The boss comprises mounting means adapted to receive the coupling or valve member. The coupling or valve member comprises at least one O-ring for engagement with the mounting means. The boss or the coupling or valve member further comprises depressurization means arranged to transport fluid from a void arranged axially outside the at least one O-ring and out of the boss.

In one embodiment, the boss according to the present invention may comprise an imbedded member which is fully imbedded towards the inside of the pressure container, and the boss comprises a lip arranged between the imbedded member and the coupling or valve member.

In one aspect of the invention, the boss further comprises an environmental O-ring arranged axially outside the void. The environmental O-ring is preferably placed close to the axially outer end of the mounting means to avoid environmental influences on the connection between the boss and the coupling or valve member.

In one embodiment, the depressurization means comprises a fluid passage arranged within the coupling or valve member.

In another embodiment the boss comprises mounting means that comprises threads and the depressurization means comprises a groove or fluid passage in the threads.

In yet another embodiment of the boss according to the present invention, the depressurization means comprises a depressurization channel through the boss, and in another aspect the depressurization channel comprises an outlet arranged at the internal wall of the pressure supporting layer.

In one embodiment the boss comprises a connecting flange for connecting to the liner layer, and a neck part axially placed outside the connecting flange, and wherein the fiber-reinforcement of the pressure container is winded against the neck part.

BRIEF DESCRIPTION OF THE DRAWINGS

The invention will now be described with reference to the examples which are shown in the figures, wherein.

DETAILED DESCRIPTION OF THE INVENTION

Figure 1:
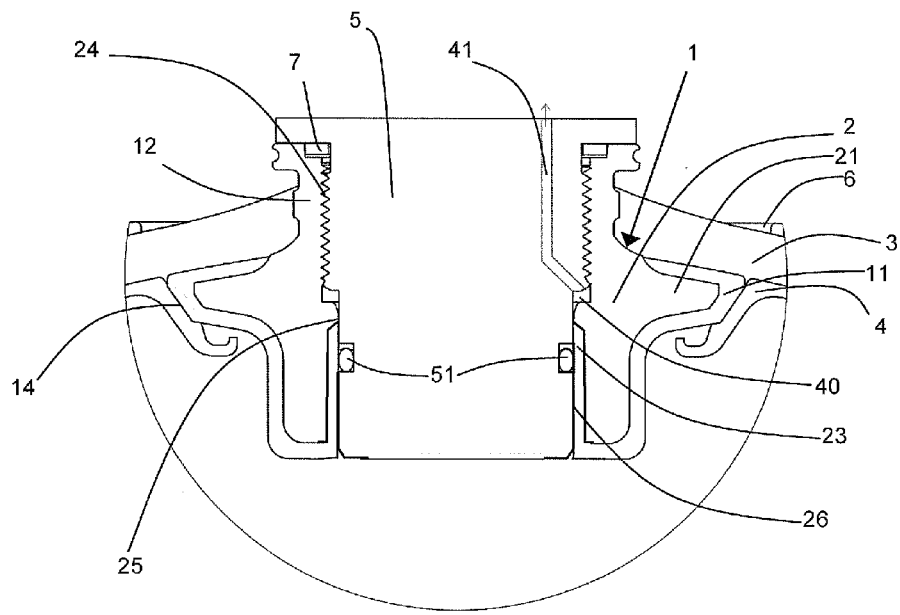
FIG. 1 illustrates a cross-section of a first embodiment of a boss including internal pressure release.
Figure 2:
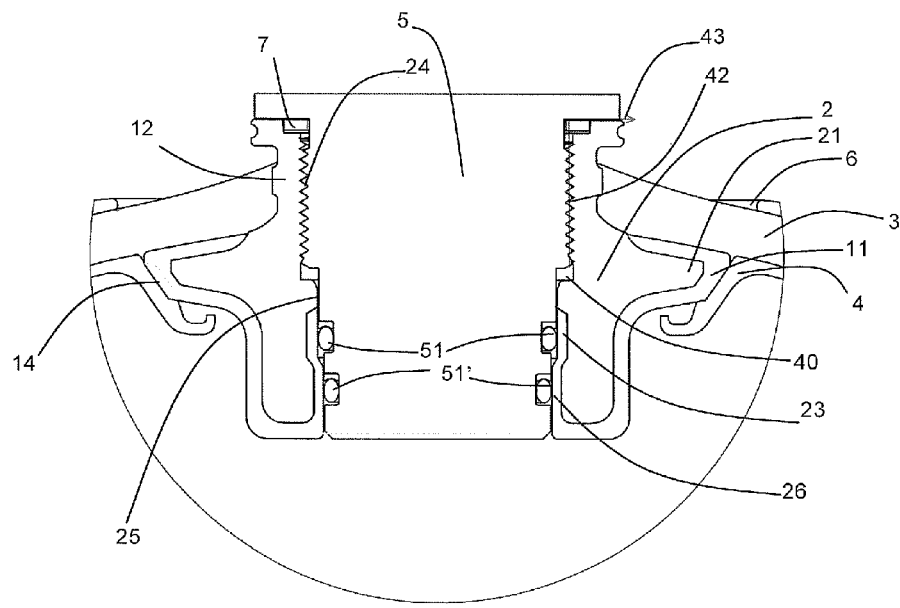
FIG. 2 illustrates a cross-section of a second embodiment of a boss including internal pressure release.
Figure 3:
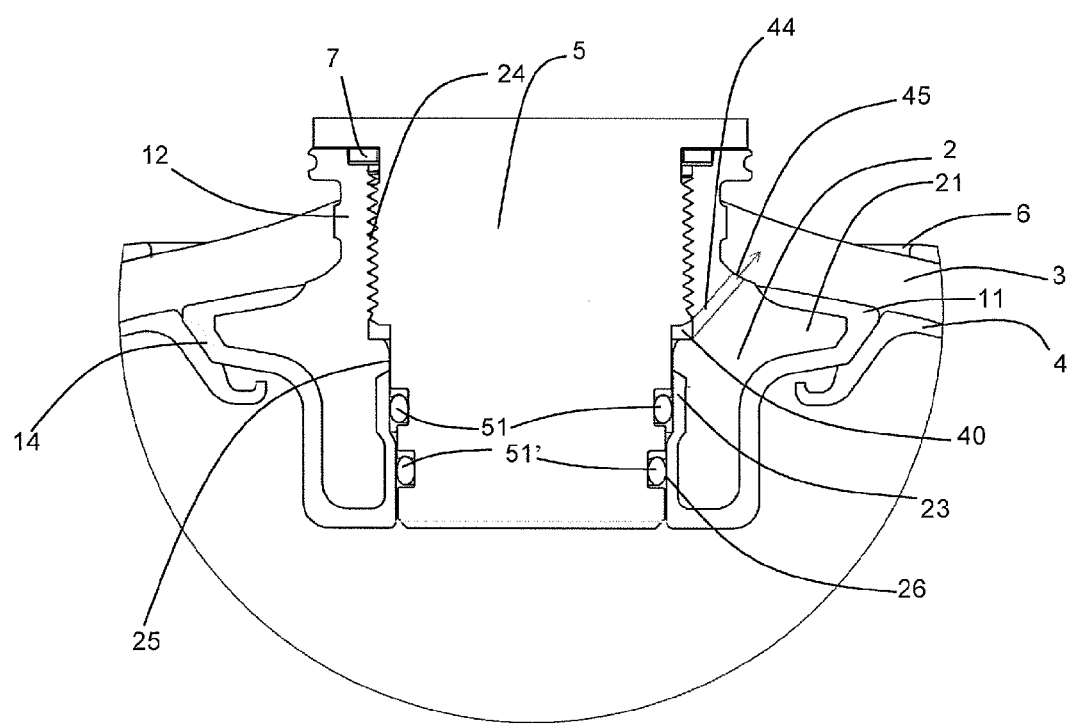
FIG. 3 illustrates a cross-section of a third embodiment of a boss including internal pressure release.

FIGS. 1, 2 and 3 illustrate three alternative embodiments of different aspects of the present invention. All the figures show a boss 1 on a pressure container, wherein the boss comprises an opening, and a coupling or valve member 5 is fitted in the opening. The boss 1 is welded, glued, casted, molded, or in another way fixed to an inner liner layer 4 on the composite pressure container with a connecting flange 11. The connecting flange is fixed to the liner layer 4 through an inclined surface 14. As mentioned above, the fixation may be carried out in a known way by welding, by different gluing techniques, or by other techniques, depending on the materials used. Alternatively, to the solution shown, the boss is an integrated part of the liner layer or the liner layer may be melted together with the connecting flange to form a continuous surface toward the opening, or the liner forms an integrated flange where the boss is connected to the outside of the integrated liner flange possibly through threads on the outside thereof. On top of the connecting flange and the liner layer, a fiber-reinforced layer 3 is winded in a way known per se. The fiber-reinforced layer thus functions as a pressure supporting layer, both for the boss 1 and the liner layer 4. Further a protective shell 6, may, as illustrated, be arranged on the outside of the container.

The boss comprises a neck part 12 which is placed axially outside the connecting flange and the pressure container. The fiber-reinforcement is winded against the neck part, which provides for good control of the winding of the fiber-reinforcement, and prevents the fiber-reinforcement from covering the opening.

The boss in addition comprises an imbedded member 2. The imbedded member 2 is made from a material with at least sufficient structural consistency to allow for repeated connecting and detachment of the coupling or valve member 5. The material for the imbedded member 2 may be different from or equal to the material of the rest of the boss 1 in which the imbedded member 2 is imbedded. The imbedded member comprises an opening which is fitted with mounting means for mounting the coupling or valve member 5. The mounting means may also be provided in the opening in the boss. From a production economic view, metal is preferred; however, the imbedded member 2 may also be formed from other materials, possibly plastic materials, e.g., fiber-reinforced plastic.

Except for the mounting means, the imbedded member is substantially cast imbedded through injection molding in the remaining material constituting the boss. The imbedded member 2 is preferably formed with a lower flange 21, which extends radially inside the connecting flange 11. In this way, the pressure supporting fiber-reinforcement will also cover the outer part of the lower flange of the imbedded member, and thus, prevent movement in an axial direction.

The mounting means may include a threaded part 24, which is formed to receive the coupling or valve member 5, and first and second supporting surfaces 25, 26. Only the outer surface of the coupling or valve member 5 is illustrated in detail in the figures, as the invention illustrated on FIGS. 1, 2 and 3 relates to the connection between the coupling or valve member 5 and the boss 1, and not to the internal configuration of the coupling or valve member as such.

The illustrated embodiment of the boss further comprises a lip 23 formed from the material of the boss, which upon mounting of the coupling or valve member 5, is positioned between the valve member and the imbedded member 2 at the end of the boss axially opposite the neck 12, and arranged inside the pressure container. The surface of the lip facing the opening forms the sealing surfaces at the inner end of the opening, in that the material of the boss imbeds the imbedded member in the inner part of the opening. The valve member is fitted with one or two O-rings 51, 51' to further improve the sealing between the outer surface of the coupling or valve member and the boss. Although the invention is here illustrated employing one O-ring in FIG. 1 and two O-rings 51, 51' in FIGS. 2 and 3, a configuration with only one O-ring 51 can equally be employed in the embodiments illustrated in FIGS. 2 and 3 and two O-rings can be employed with the embodiment illustrated in FIG. 1, as all these embodiments will benefit from the present invention.

Contents under pressure within the container will result in pressure directed from the inside of the container towards the boss 1. Such pressure results in forces against the inner part of the boss pressing the part of the boss comprising the lip 23 towards the O-rings 51, 51', thereby enhancing the sealing effects of the O-rings.

The boss and the liner layer are produced in a known way of a polymer material, preferably by spray casting and mold blowing, respectively; however, other materials or production methods may also be contemplated.

The connecting flange is fixed to the liner layer 4 through an inclined surface 14. As mentioned above, the fixation may be carried out in a known way by welding, by different gluing techniques, or by other techniques, depending on the materials used. Alternatively, for the solution shown, the boss is an integrated part of the liner layer mounted during the liner blow molding process or screwed on afterwards or the liner layer may be melted together with the connecting flange to form a continuous surface toward the opening.

To prevent movement of the imbedded member 2 caused by torsion, as well as by inward directed forces e.g., when fixing a valve, the member 2 may be formed with gripping organs which prevent rotational movement of the imbedded member 2 relative to the pressure container. These gripping organs may be formed as holes, recesses or grooves in the imbedded member.

The coupling or valve member 5 may comprise an environmental O-ring 7 or a similar protection part arrange near the neck 12 of the boss. The purpose of the environmental O-ring 7 is to seal the outside entrance from the connection between the mounting means and the coupling or valve member 5. The environmental O-ring 7 limits the possibility of moisture, dirt or dust entering the boss; however the optional environmental O-ring 7 is mainly a protection against the environment within which the container is placed and not an O-ring sealing against the internal pressure within the container.

FIGS. 1, 2 and 3 illustrate alternative solutions with respect to the problem of avoiding pressure build up within the boss. The problem to be solved is that sealing obtained by the one or more O-rings 51, 51' may be subject to permeation. Permeation may also take place through other parts of the boss, partly depending on the materials selected for forming the boss. Plastic materials generally are more exposed to permeation than metals. If permeation is allowed to proceed, fluid pressure may be built up within the boss, which again will influence the safety and reliability of the boss.

FIG. 1 illustrates a first embodiment of a boss 1 and coupling or valve 5 according to this aspect of the present invention. In this embodiment the coupling or valve member 5 comprises a depressurization channel 41 directing any permeated fluid from a void 40 in the passage between the boss 1 and the coupling or valve member 5 arranged axially outside the o-ring 51. The depressurization channel 41 preferably communicates with an outlet from the coupling or valve member 5 normally used for transferring fluid from the container to a place of use.

FIG. 2 illustrates a second alternative embodiment of this aspect of the present invention. Here the void 40 is brought in fluid communication with the external surroundings through a groove 42 or the like in the threaded part 24. The groove can be provided by the selected thread interface design, in that the thread on the boss and on the coupling or valve member can be selected so that they provide a fluid passage along the thread when the coupling or valve member is screwed onto the boss. If the coupling or valve member 5 comprises the optional environmental O-ring 7, the O-ring 7 has none or limited pressure sealing capabilities so that pressure cannot build up inside the O-ring but is released to the surroundings via opening 43.

FIG. 3 illustrates a third alternative embodiment of this aspect of the present invention. Here the void 40 is brought in fluid communication with the external surroundings through a depressurization channel 44 extending through the boss 1. The depressurization channel may be arranged in the imbedded member 2 as illustrated or through any other part of the boss. The outlet 45 of the depressurization channel is arranged at the internal wall of the fiber-reinforced layer 3. The reinforcement layer is not fluid proof and any fluid will therefore pass through the fiber-reinforced layer 3 and be released to the surroundings. The fiber-reinforced layer 3 will protect the depressurization channel 44 and the boss from dust or similar environmental influences.

The employed O-ring(s) can be adapted in size and material to the pressure and compounds forming the content of the container.

The production of any of the embodiments of the boss may be performed using well known commercially available methods.

The invention claimed is:

1. A composite pressure container for fluids, comprising:
   a pressure container having an inner fluid-tight liner layer, a pressure supporting layer formed by winding fiber-reinforcement onto the liner layer, and a central opening in one end;
   a boss disposed in the central opening of the pressure container; and
   a coupling or valve member fitted in an opening formed in the boss,
   wherein the boss comprises mounting structure adapted to receive the coupling or valve member,
   wherein the coupling or valve member comprises at least one O-ring for engagement with the mounting structure,
   wherein the boss or the coupling or valve member further comprises a depressurization fluid passage arranged to transport fluid from a void between the boss and the coupling or valve member, and out of the boss,
   wherein the void is arranged axially outside relative to the at least one O-ring,
   wherein the depressurization fluid passage comprises a depressurization channel through the boss, and
   wherein the depressurization channel comprises an outlet arranged at an internal wall of the pressure supporting layer.

2. The composite pressure container according to claim 1, wherein the boss comprises an imbedded member fully imbedded towards an inside of the pressure container, and wherein the boss comprises a lip arranged between the imbedded member and the coupling or valve member.

3. The composite pressure container according to claim 1, wherein the boss further comprises an environmental O-ring arranged axially outside relative to the void.

4. The composite pressure container according to claim 2, wherein the boss further comprises an environmental O-ring arranged axially outside relative to the void.

5. The composite pressure container according to claim 2, wherein the depressurization fluid passage comprises a depressurization channel through the boss.

6. The composite pressure container according to claim 3, wherein the depressurization fluid passage comprises a depressurization channel through the boss.

* * * * *